United States Patent
Morikawa et al.

(10) Patent No.: US 11,172,073 B2
(45) Date of Patent: Nov. 9, 2021

(54) IMAGE PROCESSING APPARATUS, IMAGE PROCESSING SYSTEM, AND CONTROL METHOD OF IMAGE PROCESSING APPARATUS

(71) Applicant: BROTHER KOGYO KABUSHIKI KAISHA, Nagoya (JP)

(72) Inventors: Shota Morikawa, Nagoya (JP); Satoru Arakane, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/074,989

(22) Filed: Oct. 20, 2020

(65) Prior Publication Data

US 2021/0144262 A1   May 13, 2021

(30) Foreign Application Priority Data

Nov. 8, 2019   (JP) .............................. JP2019-202855

(51) Int. Cl.
*H04N 1/40* (2006.01)
*H04N 1/00* (2006.01)
*H04N 1/032* (2006.01)
*H04N 1/028* (2006.01)
*H04N 1/10* (2006.01)

(52) U.S. Cl.
CPC ..... *H04N 1/00045* (2013.01); *H04N 1/00015* (2013.01); *H04N 1/00018* (2013.01); *H04N 1/00023* (2013.01); *H04N 1/00082* (2013.01); *H04N 1/0097* (2013.01); *H04N 1/028* (2013.01); *H04N 1/032* (2013.01); *H04N 1/10* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,545,773 B1 * | 4/2003 | Hudson | B41J 2/2132 347/174 |
| 2007/0046707 A1 * | 3/2007 | Sakakibara | H04N 1/6094 347/14 |
| 2010/0118348 A1 * | 5/2010 | Jinno | B41J 2/2132 358/3.24 |

(Continued)

FOREIGN PATENT DOCUMENTS

JP   2017-39205 A   2/2017

*Primary Examiner* — Dung D Tran
(74) *Attorney, Agent, or Firm* — Scully, Scott, Murphy & Presser, PC

(57) ABSTRACT

An evaluation table includes: a first pixel value set; a second pixel value set next to and having a larger pixel value sum than the first pixel value set; a third pixel value set having a larger pixel value sum than the second pixel value set; a fourth pixel value set next to and having a larger pixel value sum than the third pixel value set; a fifth pixel value set having a larger pixel value sum than the fourth pixel value set; and a sixth pixel value set next to and having a larger sum than the fifth pixel value set. Each of a difference between pixel value sums of the first and second pixel value sets and a difference between pixel value sums of the fifth and sixth pixel value sets is larger than a difference between pixel value sums of the third and fourth pixel value sets.

13 Claims, 9 Drawing Sheets

| PIXEL VALUE SET | | | WEIGHTING VALUE |
|---|---|---|---|
| R | G | B | |
| 0 | 0 | 0 | 0 |
| 0 | 0 | 32 | 15 |
| 0 | 0 | 64 | 20 |
| — | — | — | — |
| 0 | 0 | 255 | 70 |
| — | — | — | — |
| 150 | 150 | 150 | 90 |
| 150 | 150 | 166 | 110 |
| 150 | 150 | 182 | 120 |
| — | — | — | — |
| 200 | 200 | 255 | 10 |
| 232 | 200 | 255 | 9 |
| — | — | — | — |
| 255 | 255 | 255 | 2 |

(56) References Cited

U.S. PATENT DOCUMENTS

| | | | |
|---|---|---|---|
| 2013/0016369 A1* | 1/2013 | Tsujiguchi | G06K 15/105 |
| | | | 358/1.8 |
| 2017/0050431 A1 | 2/2017 | Morikawa | |
| 2020/0055324 A1* | 2/2020 | Kuno | B41J 2/2132 |
| 2020/0311497 A1* | 10/2020 | Kondo | H04N 1/00045 |
| 2021/0037165 A1* | 2/2021 | Morikawa | H04N 1/6047 |

* cited by examiner

FIG. 8A

| PIXEL VALUE SET | | | WEIGHTING VALUE |
|---|---|---|---|
| R | G | B | |
| 0 | 0 | 0 | 0 |
| 0 | 0 | 32 | 15 |
| 0 | 0 | 64 | 20 |
| — | — | — | — |
| 0 | 0 | 255 | 70 |
| — | — | — | — |
| 150 | 150 | 150 | 90 |
| 150 | 150 | 166 | 110 |
| 150 | 150 | 182 | 120 |
| — | — | — | — |
| 200 | 200 | 255 | 10 |
| 232 | 200 | 255 | 9 |
| — | — | — | — |
| 255 | 255 | 255 | 2 |

FIG. 8B

| PIXEL VALUE SET | | | WEIGHTING VALUE |
|---|---|---|---|
| R | G | B | |
| 0 | 0 | 32 | 10 |
| 0 | 0 | 64 | 15 |
| — | — | — | — |
| 0 | 0 | 255 | 80 |
| — | — | — | — |
| 150 | 150 | 150 | 100 |
| 150 | 150 | 166 | 120 |
| 150 | 150 | 182 | 130 |
| — | — | — | — |
| 200 | 200 | 255 | 20 |
| 232 | 200 | 255 | 7 |
| — | — | — | — |
| 255 | 255 | 255 | 5 |

IMAGE PROCESSING APPARATUS, IMAGE PROCESSING SYSTEM, AND CONTROL METHOD OF IMAGE PROCESSING APPARATUS

CROSS REFERENCE TO RELATED APPLICATIONS

This application claims priority from Japanese Patent Application No. 2019-202855 filed Nov. 8, 2019. The entire content of the priority application is incorporated herein by reference.

TECHNICAL FIELD

This disclosure relates to an image processing apparatus, an image processing system, and a control method of an image processing apparatus.

BACKGROUND

It is disclosed that the moving direction of a head is determined by referring to a lookup table (evaluation table) in order to suppress the color difference caused by the difference in an ink overlapping order. In the lookup table, weighting values are associated with a plurality of sets of RGB values (pixel values).

SUMMARY

According to one aspect, this specification discloses an image processing apparatus. The image processing apparatus includes a memory and a controller. The memory is configured to store an evaluation table in which a plurality of pixel value sets and weighting values for respective ones of the plurality of pixel value sets are associated with each other, each of the plurality of pixel value sets including pixel values of a plurality of types of liquid. The controller is configured to determine whether to perform one-way recording or two-way recording. The one-way recording is recording in which liquid is ejected onto a recording medium from a plurality of nozzle groups of a head in either one of a forward movement and a reverse movement of the head in a scanning direction based on image data and the evaluation table stored in the memory. The plurality of nozzle groups is for ejecting respective ones of the plurality of types of liquid. The plurality of nozzle groups is arranged in the scanning direction. The two-way recording is recording in which liquid is ejected onto a recording medium from the plurality of nozzle groups in both of the forward movement and the reverse movement of the head in the scanning direction. Each of the weighting values is a value indicative of a difference between an image indicated by the image data and an image recorded on the recording medium, the difference being caused by an overlapping order of the plurality of types of liquid. The plurality of pixel value sets in the evaluation table includes: a first pixel value set; a second pixel value set next to the first pixel value set, the second pixel value set having a larger pixel value sum than the first pixel value set, the pixel value sum being a sum of the pixel values of the plurality of types of liquid; a third pixel value set having a larger pixel value sum than the second pixel value set; a fourth pixel value set next to the third pixel value set, the fourth pixel value set having a larger pixel value sum than the third pixel value set; a fifth pixel value set having a larger pixel value sum than the fourth pixel value set; and a sixth pixel value set next to the fifth pixel value set, the sixth pixel value set having a larger pixel value sum than the fifth pixel value set. A difference between a pixel value sum of the first pixel value set and the pixel value sum of the second pixel value set is larger than a difference between the pixel value sum of the third pixel value set and the pixel value sum of the fourth pixel value set. A difference between the pixel value sum of the fifth pixel value set and the pixel value sum of the sixth pixel value set is larger than the difference between the pixel value sum of the third pixel value set and the pixel value sum of the fourth pixel value set.

According to another aspect, this specification also discloses an image processing system. The image processing system includes a first apparatus, a second apparatus, and a controller. The first apparatus includes a first memory. The second apparatus includes a second memory. Each of the first memory and the second memory is configured to store an evaluation table in which a plurality of pixel value sets and weighting values for respective ones of the plurality of pixel value sets are associated with each other. Each of the plurality of pixel value sets includes pixel values of a plurality of types of liquid. The controller is configured to determine whether to perform one-way recording or two-way recording. The one-way recording is recording in which liquid is ejected onto a recording medium from a plurality of nozzle groups of a head in either one of a forward movement and a reverse movement of the head in a scanning direction based on image data and the evaluation table stored in one of the first memory and the second memory. The plurality of nozzle groups is for ejecting respective ones of the plurality of types of liquid, the plurality of nozzle groups being arranged in the scanning direction. The two-way recording is recording in which liquid is ejected onto a recording medium from the plurality of nozzle groups in both of the forward movement and the reverse movement of the head in the scanning direction. Each of the weighting values is a value indicative of a difference between an image indicated by the image data and an image recorded on the recording medium, the difference being caused by an overlapping order of the plurality of types of liquid. In each of the first memory and the second memory, the plurality of pixel value sets in the evaluation table includes: a first pixel value set; a second pixel value set next to the first pixel value set, the second pixel value set having a larger pixel value sum than the first pixel value set, the pixel value sum being a sum of the pixel values of the plurality of types of liquid; a third pixel value set having a larger pixel value sum than the second pixel value set; a fourth pixel value set next to the third pixel value set, the fourth pixel value set having a larger pixel value sum than the third pixel value set; a fifth pixel value set having a larger pixel value sum than the fourth pixel value set; and a sixth pixel value set next to the fifth pixel value set, the sixth pixel value set having a larger pixel value sum than the fifth pixel value set. A difference between a pixel value sum of the first pixel value set and the pixel value sum of the second pixel value set is larger than a difference between the pixel value sum of the third pixel value set and the pixel value sum of the fourth pixel value set. A difference between the pixel value sum of the fifth pixel value set and the pixel value sum of the sixth pixel value set is larger than the difference between the pixel value sum of the third pixel value set and the pixel value sum of the fourth pixel value set. A capacity of the first memory is larger than a capacity of the second memory. A number of the pixel value sets included in the evaluation table stored in the first memory is larger than a number of the pixel value sets included in the evaluation table stored in the second memory.

According to still another aspect, this specification also discloses a control method of controlling an image processing apparatus including a memory and a controller. The memory stores an evaluation table in which a plurality of pixel value sets and weighting values for respective ones of the plurality of pixel value sets are associated with each other. Each of the plurality of pixel value sets includes pixel values of a plurality of types of liquid. The control method includes: determining whether to perform one-way recording or two-way recording, the one-way recording being recording in which liquid is ejected onto a recording medium from a plurality of nozzle groups of a head in either one of a forward movement and a reverse movement of the head in a scanning direction based on image data and the evaluation table stored in the memory. The plurality of nozzle groups is for ejecting respective ones of the plurality of types of liquid. The plurality of nozzle groups is arranged in the scanning direction. The two-way recording is recording in which liquid is ejected onto a recording medium from the plurality of nozzle groups in both of the forward movement and the reverse movement of the head in the scanning direction. Each of the weighting values being a value indicative of a difference between an image indicated by the image data and an image recorded on the recording medium, the difference being caused by an overlapping order of the plurality of types of liquid. The plurality of pixel value sets in the evaluation table includes: a first pixel value set; a second pixel value set next to the first pixel value set, the second pixel value set having a larger pixel value sum than the first pixel value set, the pixel value sum being a sum of the pixel values of the plurality of types of liquid; a third pixel value set having a larger pixel value sum than the second pixel value set; a fourth pixel value set next to the third pixel value set, the fourth pixel value set having a larger pixel value sum than the third pixel value set; a fifth pixel value set having a larger pixel value sum than the fourth pixel value set; and a sixth pixel value set next to the fifth pixel value set, the sixth pixel value set having a larger pixel value sum than the fifth pixel value set. A difference between a pixel value sum of the first pixel value set and the pixel value sum of the second pixel value set is larger than a difference between the pixel value sum of the third pixel value set and the pixel value sum of the fourth pixel value set. A difference between the pixel value sum of the fifth pixel value set and the pixel value sum of the sixth pixel value set is larger than the difference between the pixel value sum of the third pixel value set and the pixel value sum of the fourth pixel value set.

Further, this disclosure may be implemented as a non-transitory computer-readable storage medium storing a program.

BRIEF DESCRIPTION OF THE DRAWINGS

Embodiments in accordance with this disclosure will be described in detail with reference to the following figures wherein:

FIGS. 8A and 8B show examples of an evaluation table; and

DETAILED DESCRIPTION

The larger the data amount of the evaluation table (for example, the larger the number of pixel value sets), the more accurately the determination processing of the head moving direction can be executed. However, if the data amount of the evaluation table is large, it is necessary to increase the capacity of the storage that stores the evaluation table, which increases the cost of the apparatus.

In view of the foregoing, an example of an objective of this disclosure is to provide an image processing apparatus configured to suppress the data amount of an evaluation table while maintaining the accuracy of determination processing, an image processing system, and a control method of an image processing apparatus.

Figure 1:
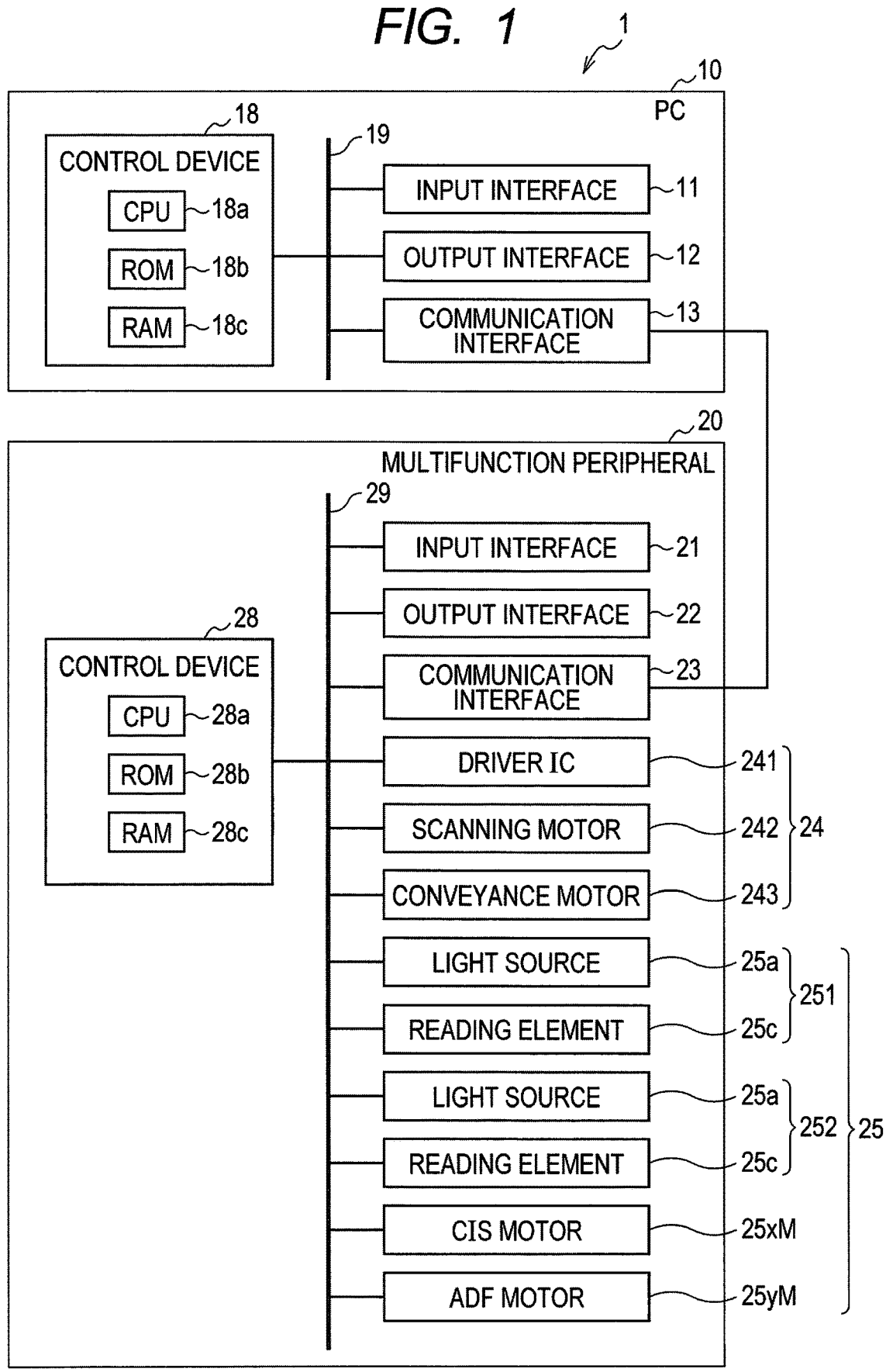
FIG. 1 is a block diagram showing the electrical configuration of an image processing system according to an embodiment of this disclosure.

As shown in FIG. 1, an image processing system 1 according to an embodiment of this disclosure includes a PC (Personal Computer) 10 and a multifunction peripheral 20. In this embodiment, each of the PC 10 and the multifunction peripheral 20 is an example of "image processing apparatus". Further, the PC 10 is an example of "first apparatus", and the multifunction peripheral 20 is an example of "second apparatus".

The PC 10 includes an input interface 11, an output interface 12, a communication interface (I/F) 13, and a control device 18. The control device 18 is connected to the input interface 11, the output interface 12, and the communication interface 13 through an internal bus 19.

The multifunction peripheral 20 includes an input interface 21, an output interface 22, a communication interface (I/F) 23, a recording unit (print engine) 24, a reading unit (scanner) 25, and a control device 28. The control device 28 is connected to the input interface 21, the output interface 22, the communication interface 23, the recording unit 24, and the reading unit 25 through an internal bus 29.

The input interfaces 11 and 21 are elements that receive operations by a user, and are a keyboard, a mouse, buttons, and a touch panel, for example.

The output interfaces 12 and 22 are elements that output images and sounds, and are displays and speakers, for example.

The communication interfaces 13 and 23 are interfaces for communicating with other devices, and are connected to each other.

The control devices 18 and 28 include CPUs (Central Processing Units) 18*a* and 28*a*, ROMs (Read Only Memory) 18*b* and 28*b*, and RAMs (Random Access Memory) 18*c* and 28*c*, respectively. The ROMs 18*b* and 28*b* store programs and data for the CPUs 18*a* and 28*a* to perform various controls. The RAMs 18c and 28c temporarily store data used when the CPUs 18a and 28a execute programs.

The CPUs 18a and 28a are examples of "controller". The ROMs 18b and 28b are examples of "memory" and store an evaluation table described later. The ROM 18b is an example of "first memory", and the ROM 28b is an example of "second memory".

The recording unit 24 includes a head 240 (see FIG. 2), a driver IC 241, a scanning motor 242, and a conveyance motor 243.

Figure 2:
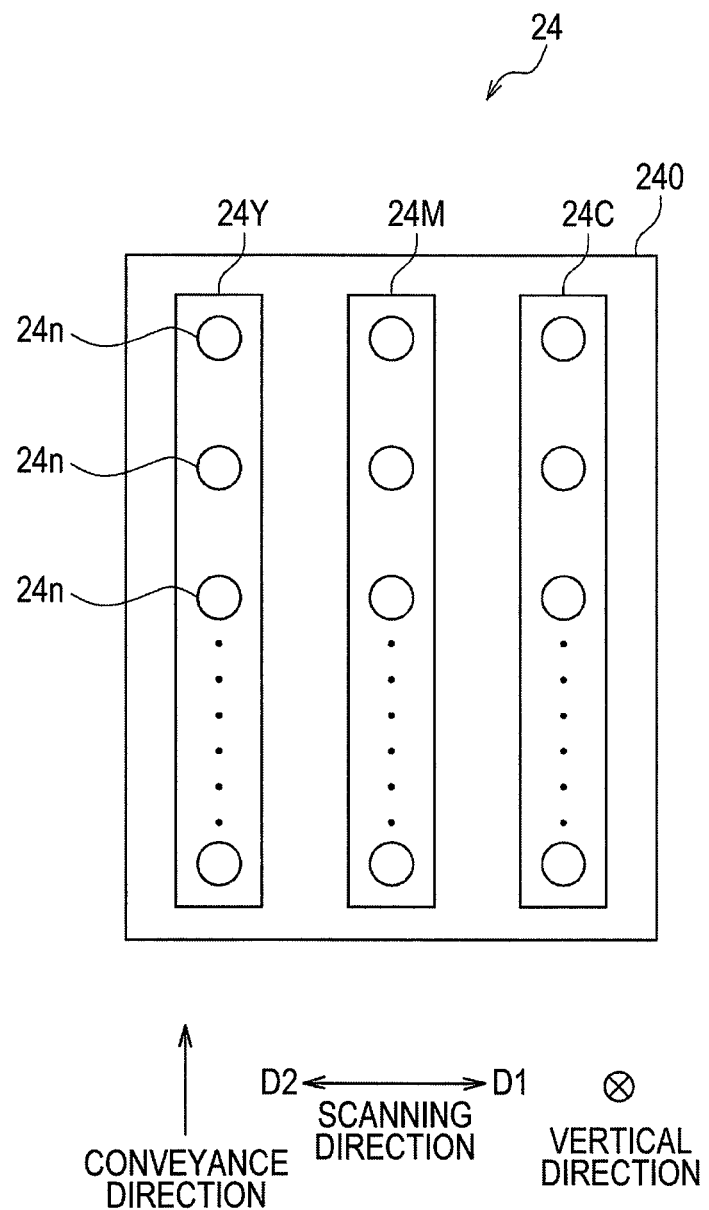
FIG. 2 is a schematic plan view showing a head of a multifunction peripheral constituting the image processing system shown in FIG. 1.

As shown in FIG. 2, the head 240 has a plurality of nozzles 24n on the lower surface thereof. The nozzles 24n form three nozzle groups 24C, 24M, and 24Y arranged in the scanning direction (the direction perpendicular to the vertical direction). Each of the nozzle groups 24C, 24M, and 24Y is constituted by a plurality of nozzles 24n arranged in the conveyance direction (the direction perpendicular to the vertical direction and the scanning direction). The nozzles 24n forming the nozzle group 24C eject cyan ink, the nozzles 24n forming the nozzle group 24M eject magenta ink, and the nozzles 24n forming the nozzle group 24Y eject yellow ink. That is, the nozzle groups 24C, 24M, and 24Y correspond to three types (three colors) of liquid (ink) of CMY (C=cyan, M=magenta, Y=yellow). In response to a drive signal from the driver IC 241, actuators (not shown) of the head 240 are driven so that ink is ejected from the nozzles 24n.

Figure 3:
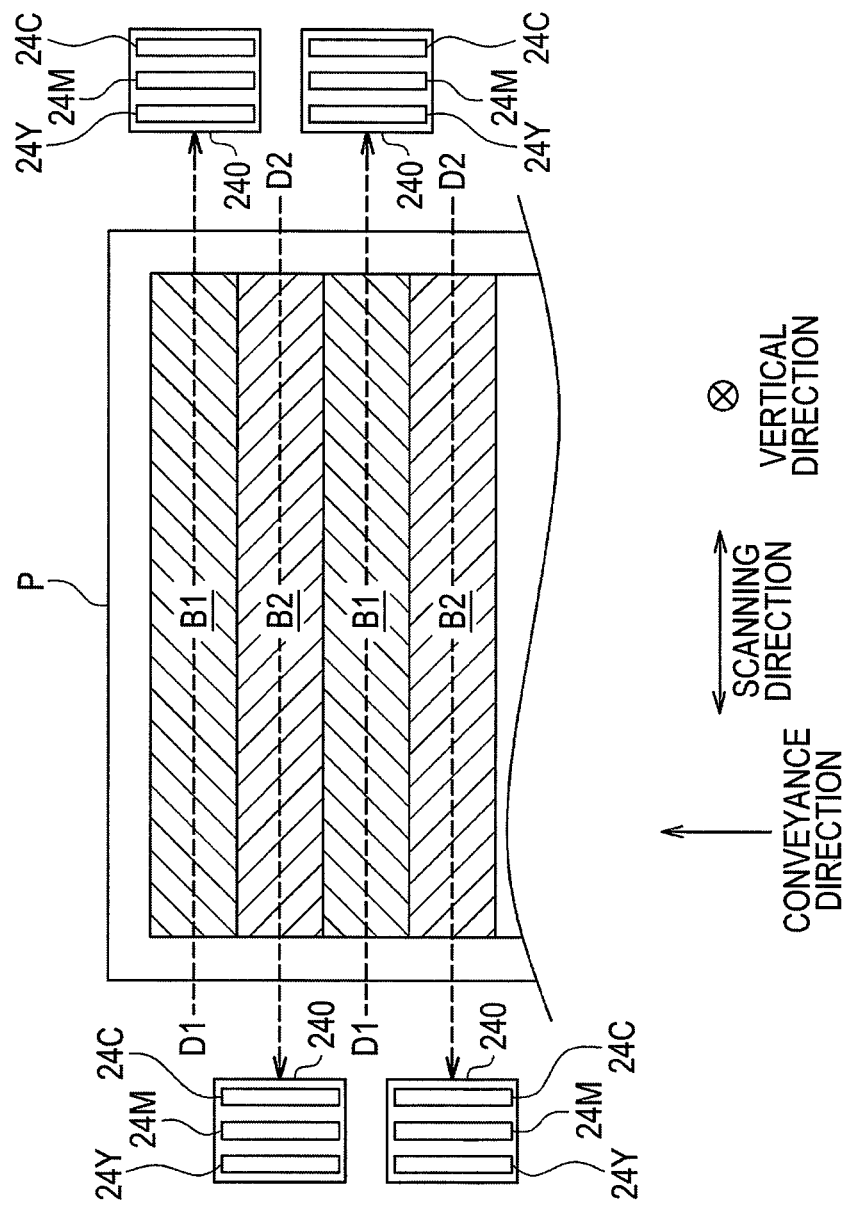
FIG. 3 is a schematic plan view for explaining recording processing performed by the head shown in FIG. 2.
Figure 4:
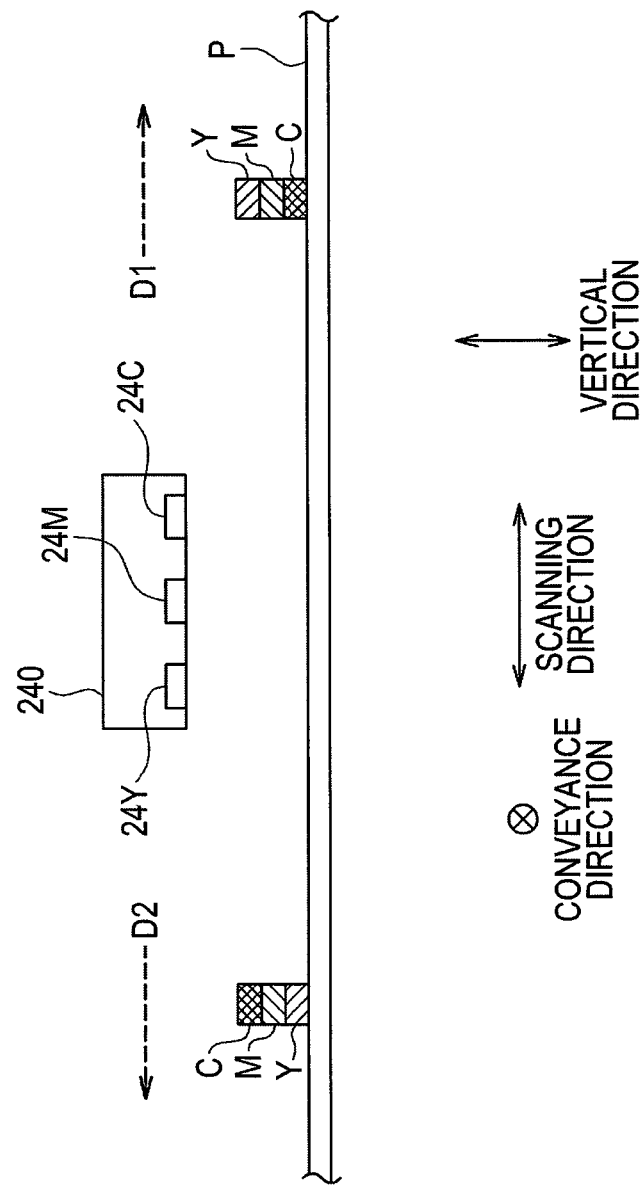
FIG. 4 is a schematic side view for explaining the recording processing performed by the head shown in FIG. 2.

The head 240 reciprocates in the scanning direction by driving of the scanning motor 242 (see FIGS. 2 to 4). The head 240 alternately performs forward movement (movement in a forward direction D1) and return movement (movement in a reverse direction D2) along the scanning direction. The forward direction D1 and the reverse direction D2 are both parallel to the scanning direction and opposite to each other.

A plurality of conveyance rollers (not shown) are arranged along a conveyance path passing below the head 240. The conveyance rollers are driven to rotate by the conveyance motor 243, thereby paper P which is an example of "recording medium" is conveyed along the conveyance path. The paper P moves below the head 240 in the conveyance direction (see FIGS. 3 and 4).

A conveyance operation of conveying the paper P by a particular amount in the conveyance direction and an ejection operation of ejecting ink from the nozzles 24n while moving the head 240 in the forward direction D1 or the reverse direction D2 are alternately performed. With these operations, ink dots are formed on the paper P and an image is recorded.

The recording includes "one-way recording" and "two-way recording".

The "one-way recording" is to eject ink from the nozzle groups 24C, 24M, and 24Y onto the paper P either when the head 240 is moved in the forward direction D1 or when the head 240 is moved in the reverse direction D2. In the "one-way recording", ink is ejected from the nozzle 24n while moving the head 240 in the same direction as the movement direction in the previous ejection operation (the forward direction D1 or the reverse direction D2). In this case, an operation of moving the head 240 in the opposite direction to the movement direction of the previous ejection operation without ejecting ink from the nozzles 24n is performed between the previous ejection operation and the current ejection operation. That is, assuming that each movement of the head 240 in the forward direction D1 or the reverse direction D2 is one scan, a total of three scans are performed from the previous ejection operation to the completion of the current ejection operation.

The "two-way recording" means ejecting ink from the nozzle groups 24C, 24M, and 24Y onto the paper P when the head 240 is moved in each of the forward direction D1 and the reverse direction D2. In the "two-way recording", ink is ejected from the nozzles 24n while moving the head 240 in the direction opposite to the movement direction in the previous ejection operation (the forward direction D1 or the reverse direction D2). In this case, no operation of moving the head 240 along the scanning direction is performed between the previous ejection operation and the current ejection operation. That is, assuming that the movement of the head 240 in the forward direction D1 or the reverse direction D2 is one scan, a total of two scans are performed from the previous ejection operation to the completion of the current ejection operation. Thus, "two-way recording" improves the recording speed compared with "one-way recording".

FIG. 3 shows an example in which an image is recorded by "two-way recording" on the paper P on band areas B1 and B2 extending in the scanning direction. The band areas B1 and B2 have the same length (width) in the conveyance direction and are arranged alternately in the conveyance direction. In the example of FIG. 3, after an ejection operation is performed on the band area B1 while moving the head 240 in the forward direction D1 in the first scan, a conveyance operation is performed in which the paper P is conveyed in the conveyance direction by a particular amount (the same amount as the width of the band areas B1 and B2), and thereafter, in the second scan, an ejection operation is performed on the band area B2 while moving the head 240 in the reverse direction D2. By alternately performing the ejection operation and the conveyance operation on the band areas B1 and B2, an entire image is recorded on the paper P.

The arrangement of the nozzle groups 24C, 24M, 24Y is asymmetric with respect to the scanning direction. That is, the nozzle groups 24Y, 24M, 24C corresponding to YMC are arranged along the forward direction D1, and the nozzle groups 24C, 24M, 24Y corresponding to CMY are arranged along the reverse direction D2. That is, the arrangement of the nozzle groups is different between the forward direction D1 and the reverse direction D2. Thus, as shown in FIG. 4, the overlapping order of the ink is different between the case where the ejection operation is performed while moving the head 240 in the forward direction D1 and the case where the ejection operation is performed while the head 240 is moved in the reverse direction D2. When the head 240 is moved in the forward direction D1, the ink is ejected in the order of CMY, and the ink lands on the paper P in the order of CMY. When the head 240 is moved in the reverse direction D2, the ink is ejected in the order of YMC, and the ink lands on the paper P in the order of YMC. Even if the type of ink and the amount of each color ink are the same between the case where the ejection operation is performed while moving the head 240 in the forward direction D1 and the case where the ejection operation is performed while moving the head 240 in the reverse direction D2, the color of the stacked inks may look different between the two cases. In order to suppress the color difference caused by the difference in the ink overlapping order ("color difference"), the movement direction of the head 240 is determined by using the evaluation table stored in the ROMs 18b and 28b, as described later.

The image processing system 1 of this embodiment is so configured that the color of the image indicated by image data is recreated accurately when an ejection operation is performed while moving the head 240 in the forward direction D1, and the color of a recorded image may deviate from the color of the image indicated by image data when an ejection operation is performed while moving the head 240 in the reverse direction D2. Thus, in response to determining that the deviation is larger than a certain level, ejection operations are performed only when the head 240 is moved in the forward direction D1 (S14 and S15 in FIG. 7).

As shown in FIG. 1, the reading unit 25 includes a first line sensor 251, a second line sensor 252, a CIS motor 25xM, and an ADF motor 25yM. Each of the line sensors 251 and 252 is, for example, a CIS (Contact Image Sensor) type (an equal magnification optical system), and includes a light source 25a, a lens 25b (see FIG. 5), and a reading element 25c.

Figure 5:
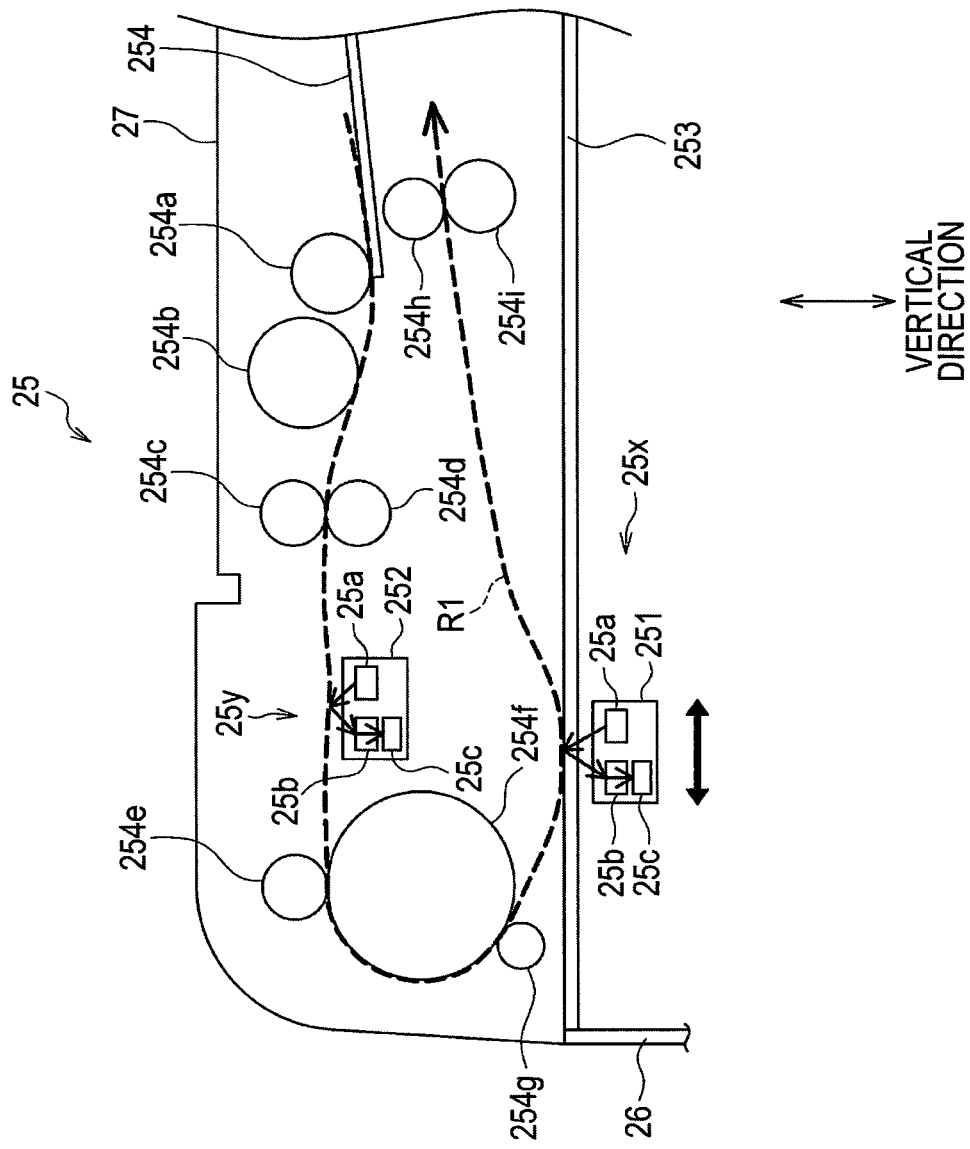
FIG. 5 is a schematic side view showing a reading unit of the multifunction peripheral constituting the image processing system shown in FIG. 1.

As shown in FIG. 5, the reading unit 25 includes a flatbed scanner unit 25x that reads an image of the paper P placed on a document table 253 and an ADF scanner unit 25y that reads an image of the paper P that is conveyed.

The flatbed scanner unit 25x includes the document table 253, the first line sensor 251, and the CIS motor 25xM (see FIG. 1). The document table 253 is formed of a light-transmissive plate made of plastic, glass, or the like fitted on the top surface of the housing 26 of the multifunction peripheral 20. The first line sensor 251 is arranged below the document table 253 in the housing 26. A cover 27 configured to be opened and closed relative to the document table 253 is attached to the housing 26. By closing the cover 27, light from the outside is prevented from entering the first line sensor 251. When reading the image of the paper P placed on the document table 253, the CIS motor 25xM is driven and the first line sensor 251 moves along the document table 253. At this time, in the first line sensor 251, the light emitted from the light source 25a passes through the document table 253, is reflected by the paper P, and enters the reading element 25c through the lens 25b. The reading element 25c of the first line sensor 251 converts the received light into an electric signal to generate image data, and outputs the image data to the control device 28.

The ADF scanner unit 25y includes an ADF tray 254, ADF rollers 254a to 254i, an ADF motor 25yM (see FIG. 1), the second line sensor 252, and the first line sensor 251. The first line sensor 251 is an example of "first imaging sensor", and the second line sensor 252 is an example of "second imaging sensor". The ADF tray 254, the ADF rollers 254a to 254i, the ADF motor 25yM, and the second line sensor 252 are provided at the cover 27. The sheet P placed on the ADF tray 254 is conveyed along a path R1 shown by a broken line in FIG. 5 by rotation of the ADF rollers 254a to 254i by driving of the ADF motor 25yM. At this time, in the second line sensor 252, the light emitted from the light source 25a is reflected on the back surface of the paper P, passes through the lens 25b, and enters the reading element 25c. The reading element 25c of the second line sensor 252 converts the received light into an electric signal to generate image data, and outputs the image data to the control device 28. At this time, the first line sensor 251 is in a stationary state at the position shown in FIG. 5. At this time, in the first line sensor 251, the light emitted from the light source 25a is reflected on the front surface of the paper P, passes through the lens 25b, and enters the reading element 25c. The reading element 25c of the first line sensor 251 converts the received light into an electric signal to generate image data, and outputs the image data to the control device 28. In the ADF scanner unit 25y, the image data generated by the second line sensor 252 is data of the image recorded on the back surface of the paper P, and the image data generated by the first line sensor 251 is data of the image recorded on the front surface of the paper P.

Next, the processing executed by the CPU 18a of the PC 10 will be described with reference to FIG. 6.

First, the CPU 18a determines whether a recording instruction has been input by the user through the input interface 11 (step S1). Hereinafter, the "step" will be abbreviated as "S".

After S1, the CPU 18a sets "n=1" (S2).

After S2, the CPU 18a determines which of "one-way recording" and "two-way recording" is to be performed for the n-th scan based on the image data corresponding to the recording instruction input in S1 and on the evaluation table stored in the ROM 18b (S3: determination processing). That is, determination of whether to perform "one-way recording" or "two-way recording" is performed for each of a plurality of scans. The S3 (determination processing) will be described later in detail with reference to FIG. 7.

After S3, the CPU 18a converts the image data of the n-th scan into ejection data (CMY data corresponding to ink colors) (S4).

After S4, the CPU 18a transmits the ejection data generated in S4 to the CPU 28a of the multifunction peripheral 20 through the communication interfaces 13 and 23 (S5).

After S5, the CPU 18a determines whether n=N is satisfied (N: number of scans required for the recording) (S6).

In response to determining that n=N is not satisfied (S6: NO), the CPU 18a sets n=n+1 (S7), and returns the processing to S3.

In response to determining that n=N is satisfied (S6: YES), the CPU 18a ends the routine.

The CPU 28a of the multifunction peripheral 20 having received the ejection data transmitted in S5 controls the driver IC 241, the scanning motor 242, and the conveyance motor 243 to alternately perform the above-described conveyance operation and ejection operation, thereby executing recording processing.

Figure 6:
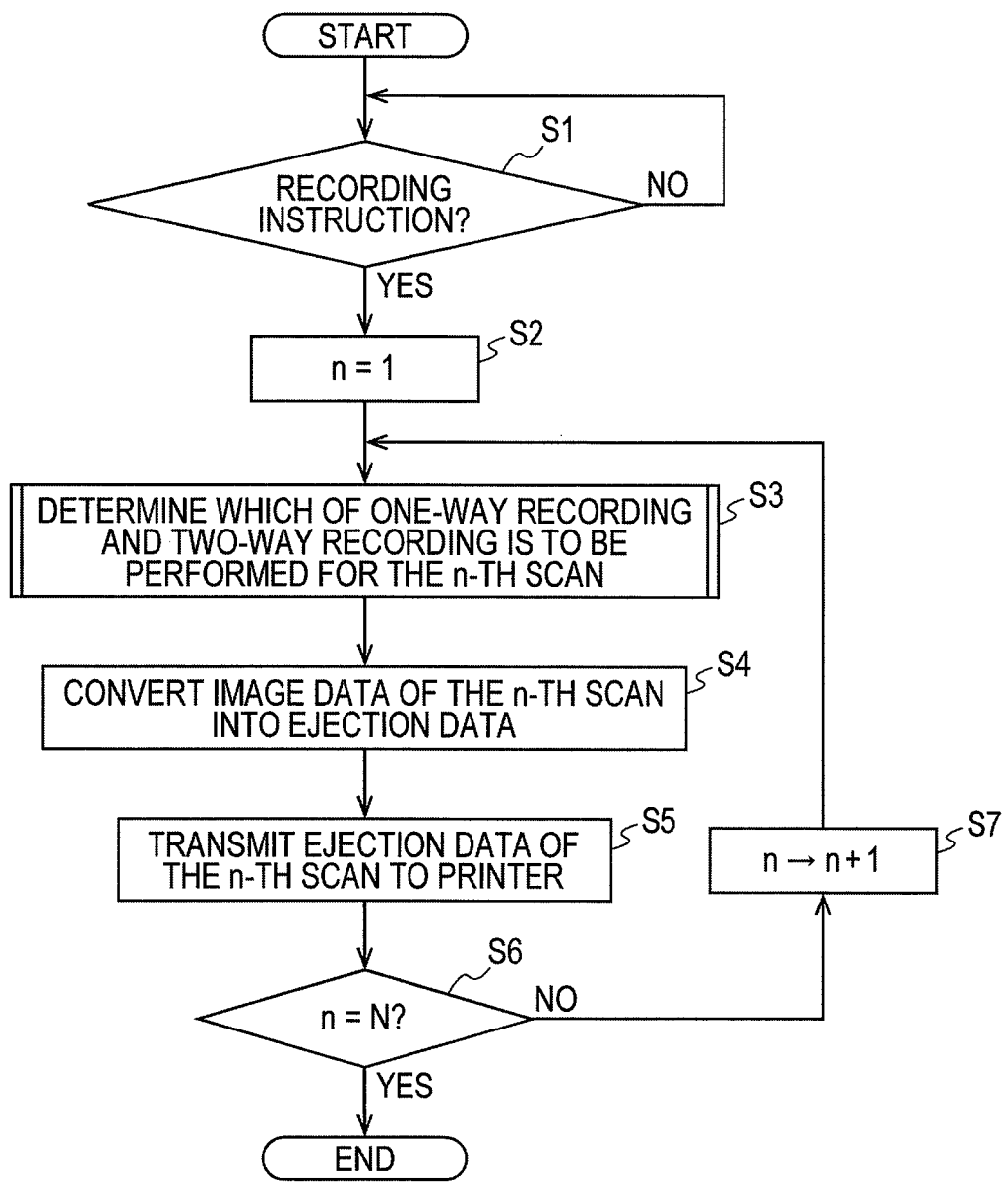
FIG. 6 is a flowchart showing processing executed by a CPU of a PC constituting the image processing system shown in FIG. 1.

The CPU 28a of the multifunction peripheral 20 also executes processing similar to the processing in FIG. 6.

In S1, the CPU 28a determines whether a recording instruction has been input through the input interface 11 of the PC 10 or the input interface 21 of the multifunction peripheral 20. In S3, the CPU 28a determines which of "one-way recording" and "two-way recording" is to be performed for the n-th scan based on the image data corresponding to the recording instruction input in S1 and on the evaluation table stored in the ROM 28b. The image data used in S3 and S4 is the image data generated by the CPU 18a in the processing by the CPU 18a described above, whereas in the processing by the CPU 28a there are both cases where it is the image data generated by the CPU 18a and where it is the image data generated by the reading unit 25. The processing of S5 is omitted. In response to determining that "n=N" is satisfied (S6: YES), the CPU 28a ends the routine after executing the recording processing.

Next, S3 (determination processing) will be described with reference to FIG. 7.

Although there are both a case where the CPU 18a of the PC 10 executes S3 and a case where the CPU 28a of the multifunction peripheral 20 executes S3 as described above. Hereinafter, S3 executed by the CPU 18a of the PC 10 will be described.

The CPU 18a first divides the image data of the n-th scan into a plurality of blocks (S11). The image data for one scan is data of the image recorded in each of the band areas B1 and B2 shown in FIG. 3. In S11, for example, the image data of the n-th scan is divided into a plurality of blocks in two directions of the scanning direction and the conveyance direction (in a matrix shape). Each block is formed by a plurality of pixels.

After S11, "m=1" is set (S12).

After S12, the CPU 18*a* refers to the evaluation table stored in the ROM 18*b* and adds up "weighting value" associated with a pixel value set (RGB values: tone values of 0 to 255) of each pixel that forms the m-th block (S13). If there is no pixel value set in the evaluation table that completely matches a pixel value set (referred to as "target pixel value set") that forms the m-th block, the pixel value set closest to the target pixel value set is selected from among the pixel value sets in the evaluation table. For example, if the target pixel value set is (0, 0, 30) and the evaluation table of FIG. 8A is used, the pixel value set (0, 0, 32) is selected from the evaluation table of FIG. 8A.

Here, the evaluation table will be described.

As shown in FIGS. 8A and 8B, the evaluation table is a table in which a pixel value set (RGB values: tone values of 0 to 255) and a weighting value are associated with each other. The weighting value is a value indicating a color difference (the difference between the image represented by image data and the image recorded on the paper P) caused by the above-described CMY ink overlapping order (the difference between the case where the ejection operation is performed while moving the head 240 in the forward direction D1 and the case where the ejection operation is performed while the head 240 is moved in the reverse direction D2). In the present embodiment, it is indicated that the larger the value of the weighting value, the larger the color difference.

A plurality of evaluation tables is provided for respective ones of the generation sources of image data. The generation sources of image data include the CPU 18*a* of the PC 10, the flatbed scanner unit 25*x* of the multifunction peripheral 20, and the ADF scanner unit 25*y* of the multifunction peripheral 20. Here, the ADF scanner unit 25*y* includes the first line sensor 251 and the second line sensor 252. The evaluation tables include a first PC evaluation table and a second PC evaluation table corresponding to the CPU 18*a* of the PC 10, an FB evaluation table corresponding to the flatbed scanner unit 25*x*, an ADF-first line sensor evaluation table (first evaluation table) corresponding to the first sensor 251 of the ADF scanner unit 25*y*, and an ADF-second line sensor evaluation table (second evaluation table) corresponding to the second line sensor 252 of the ADF scanner unit 25*y*. The contents of these evaluation tables differ from each other depending on the generation source of image data.

The ROM 18*b* of the PC 10 stores the first PC evaluation table.

The ROM 28*b* of the multifunction peripheral 20 stores four evaluation tables of the second PC evaluation table, the FB evaluation table, the ADF-first line sensor evaluation table, and the ADF-second line sensor evaluation table.

The ROM 18*b* has a larger capacity than the ROM 28*b*. The number of pixel value sets included in the first PC evaluation table is larger than the number of pixel value sets included in the second PC evaluation table. Further, the number of pixel value sets included in the first PC evaluation table is larger than each of the number of pixel value sets included in the second PC evaluation table, the number of pixel value sets included in the FB evaluation table, the number of pixel value sets included in the ADF-first line sensor evaluation table, and the number of pixel value sets included in the ADF-second line sensor evaluation table.

In each evaluation table, when a plurality of pixel value sets is arranged in order from the smallest sum of pixel values that make up each pixel value set, the difference between the above sums in adjacent pixel value sets is not constant but is different.

For example, in the evaluation table shown in FIG. 8A, the difference between the sum of pixel values (pixel value sum) of a first pixel value set (0, 0, 0) and the sum of pixel values of a second pixel value set (0, 0, 32) is "32". The first pixel value set (0, 0, 0) has the smallest sum. The second pixel value set (0, 0, 32) is next to the first pixel value set (0, 0, 0) and has a larger sum than the first pixel value set (0, 0, 0). The difference between the sum of pixel values of a third pixel value set (150, 150, 150) and the sum of pixel values of a fourth pixel value set (150, 150, 166) having the next larger sum is "16". The third pixel value set (150, 150, 150) has a larger sum than the second pixel value set (0, 0, 32). The fourth pixel value set (150, 150, 166) is next to the third pixel value set (150, 150, 150) and has a larger sum than the third pixel value set (150, 150, 150). The difference between the sum of pixel values of a fifth pixel value set (200, 200, 255) and the sum of pixel values of a sixth pixel value set (232, 200, 255) is "32". The fifth pixel value set (200, 200, 255) has a larger sum than the fourth pixel value set (150, 150, 166). The sixth pixel value set (232, 200, 255) is next to the fifth pixel value set (200, 200, 255) and has a larger sum than the fifth pixel value set (200, 200, 255).

In the evaluation table shown in FIG. 8B, the difference between the sum of pixel values of a first pixel value set (0, 0, 32) and the sum of pixel values of a second pixel value set (0, 0, 64) is "32". The first pixel value set (0, 0, 32) has the smallest sum. The second pixel value set (0, 0, 64) is next to the first pixel value set (0, 0, 32) and has a larger sum than the first pixel value set (0, 0, 32). The difference between the sum of pixel values of a third pixel value set (150, 150, 150) and the sum of pixel values of a fourth pixel value set (150, 150, 166) is "16". The third pixel value set (150, 150, 150) has a larger sum than the second pixel value set (0, 0, 64). The fourth pixel value set (150, 150, 166) is next to the third pixel value set (150, 150, 150) and has a larger sum than the third pixel value set (150, 150, 150). The difference between the sum of pixel values of a fifth pixel value set (200, 200, 255) and the sum of pixel values of a sixth pixel value set (232, 200, 255) is "32". The fifth pixel value set (200, 200, 255) has a larger sum than the fourth pixel value set (150, 150, 166). The sixth pixel value set (232, 200, 255) is next to the fifth pixel value set (200, 200, 255) and has a larger sum than the fifth pixel value set (200, 200, 255).

Each evaluation table is set such that, for a pixel value set having a larger color difference (in the present embodiment, having a larger weighting value), the difference between the above sums in adjacent pixel value sets becomes smaller. For example, as shown in FIGS. 8A and 8B, when a plurality of pixel value sets are arranged in an order from the smallest sum of pixel values forming each pixel value set, a pixel value set near the median value is associated with a larger weighting value than other pixel value sets, and the difference between the sums in adjacent pixel value sets is small.

In each evaluation table, the weighting values are different from each other. That is, there is no same weighting value in each evaluation table.

The FB evaluation table includes a pixel value set (common pixel value set) that are neither included in the ADF-first line sensor evaluation table nor the ADF-second line sensor evaluation table, and also includes and a corresponding weighting value. For example, assuming that the evaluation table shown in FIG. 8A is the FB evaluation table and that the evaluation table shown in FIG. 8B is the ADF-first line sensor evaluation table or the ADF-second line sensor evaluation table, the evaluation table shown in FIG. 8A includes a pixel value set (0, 0, 0) which is not included in the evaluation table in FIG. 8B and a weighting value corresponding to the pixel value set.

The ADF-first line sensor evaluation table includes a pixel value set (common pixel value set) which is not included in the ADF-second line sensor evaluation table and a corresponding weighting value. For example, assuming that the evaluation table shown in FIG. 8A is the ADF-first line sensor evaluation table and that the evaluation table shown in FIG. 8B is the ADF-second line sensor evaluation table, the evaluation table shown in FIG. 8A includes a pixel value set (0, 0, 0) which is not included in the evaluation table in FIG. 8B and a weighting value corresponding to the pixel value set.

In S13, the CPU 18a refers to the first PC evaluation table stored in the ROM 18b, and adds up (accumulates) the weighting values corresponding to the pixel value sets of respective pixels forming the m-th block.

After S13, the CPU 18a determines whether the total value (addition value) obtained in S13 exceeds a threshold value (S14).

In response to determining that the total value exceeds the threshold value (S14: YES), the CPU 18a determines that one-way recording is to be performed (S15), and ends the routine.

In response to determining that the total value does not exceed the threshold value (S14: NO), the CPU 18a determines whether m=M is satisfied (M: the total number of blocks) (S16).

In response to determining that m=M is not satisfied (S16: NO), the CPU 18a sets m=m+1 (S17), and returns the processing to S13.

In response to determining that m=M is satisfied (that is, in response to determining that the total value does not exceed the threshold value for all of the plurality of blocks in the n-th scan) (S16: YES), the CPU 18a determines that two-way recording is to be performed (S18), and ends the routine.

Figure 7:
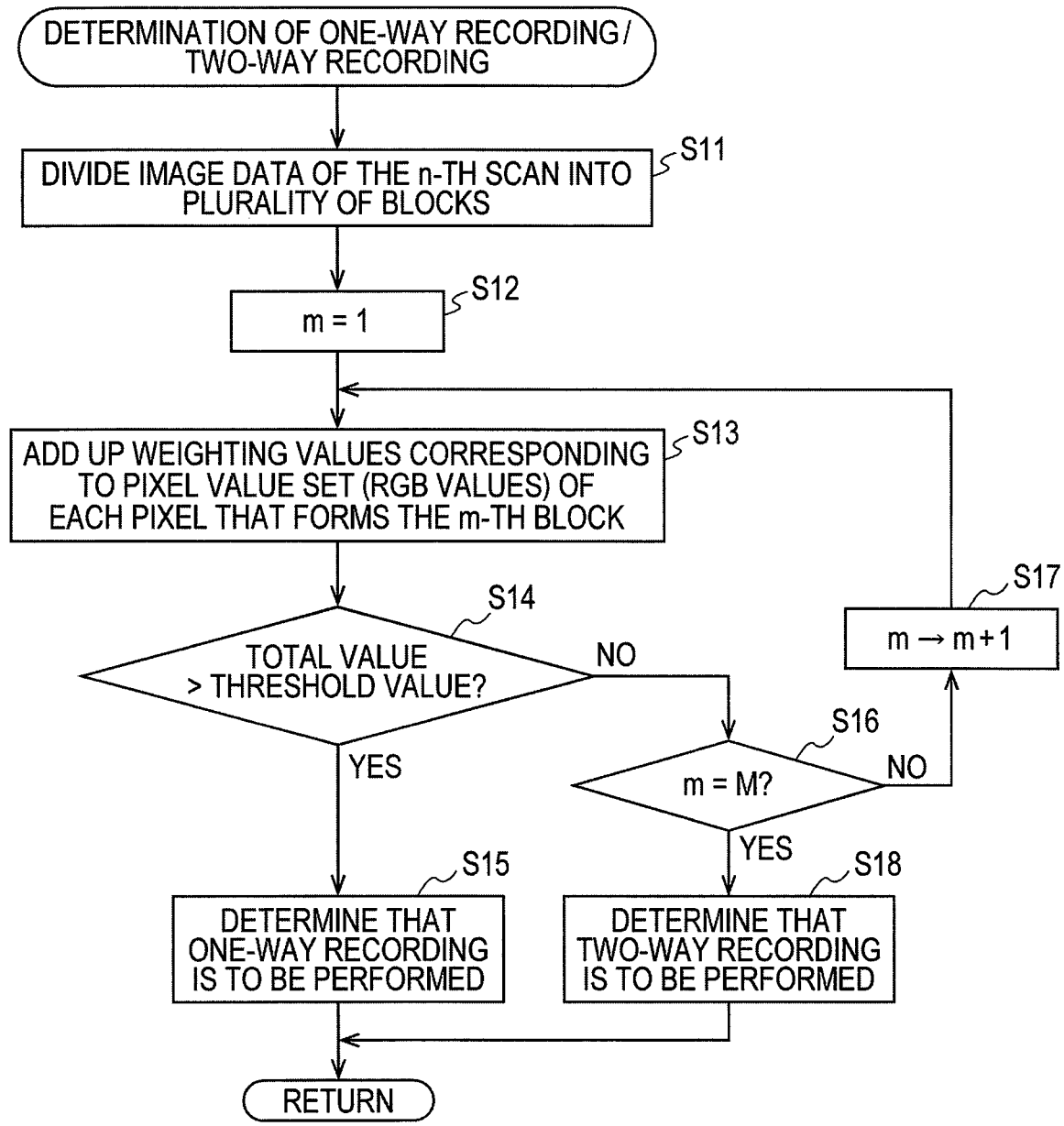
FIG. 7 is a flowchart showing step S3 (determination processing) in FIG. 6.

The CPU 28a of the multifunction peripheral 20 executes the processing similar to that in FIG. 7 in S3 (determination processing).

In S13, the CPU 28a refers to the evaluation table corresponding to the generation source of the image data from among the four evaluation tables which are "second PC evaluation table", "FB evaluation table", "ADF-first line sensor evaluation table", and "ADF-second line sensor evaluation table" stored in the ROM 28b, and adds up the weighting values corresponding to the pixel value sets (a set of RGB values: tone values of 0 to 255) of respective pixels forming the m-th block. For example, the CPU 28a refers to the second PC evaluation table when the image data corresponding to a recording instruction is data generated by the CPU 18a of the PC 10, refers to the FB evaluation table when the image data corresponding to the recording instruction is data generated by the flatbed scanner unit 25x, refers to the ADF-first line sensor evaluation table when the image data corresponding to the recording instruction is data generated by the first line sensor 251 of the ADF scanner unit 25y (the image data on the front surface of the paper P), and refers to the ADF-second line sensor evaluation table when the image data corresponding to the recording instruction is data generated by the second line sensor 252 of the ADF scanner unit 25y (the image data on the back surface of the paper P).

In a case where the pixel value set indicated by the image data is a common pixel value set and the evaluation table corresponding to the generation source of the image data does not include the common pixel value set, the CPU 28a refers to the evaluation table including the common pixel value set and adds up the weighting value corresponding to the common pixel value set. For example, in a case where the ADF-first line sensor evaluation table or the ADF-second line sensor evaluation table is used as the evaluation table corresponding to the generation source of the image data and the pixel value set indicated by the image data is the common pixel value set, the CPU 28a refers to the FB evaluation table including the common pixel value set and adds up the weighting value corresponding to the common pixel value set. Further, for example, in a case where the ADF-second line sensor evaluation table is used as the evaluation table corresponding to the generation source of the image data and the pixel value set indicated by the image data is the common pixel value set, the CPU 28a refers to the ADF-first line sensor evaluation table including the common pixel value set and adds up the weighting value corresponding to the common pixel value set.

The ROM 28b stores four conversion tables which are "PC conversion table", "FB conversion table", "ADF-first line sensor conversion table", and "ADF-second line sensor conversion table" depending on the generation source of the image data, as the conversion table for converting image data (RGB pixel value set) into ejection data (CMY pixel value set). In S4, the CPU 28a converts image data of the n-th scan into ejection data by using the conversion table corresponding to the generation source of the image data among the above four conversion tables. In S13, the CPU 28a uses the evaluation table corresponding to the conversion table used in S4 from among the four evaluation tables which are the second PC evaluation table, the FB evaluation table, the ADF-first line sensor evaluation table, and the ADF-second line sensor evaluation table stored in the ROM 28b.

As described above, according to the present embodiment, the difference in the sum of the pixel values in the plurality of pixel value sets included in the evaluation table (see FIGS. 8A and 8B) is not constant but is different (that is, nonuniform). Thus, the amount of data in the evaluation table can be suppressed while maintaining the accuracy of the determination processing.

In the image processing system 1 of the present embodiment, the evaluation table having a large number of weighting values (a large amount of data) is stored in the ROM 18b of the PC 10 having a large capacity, thereby enhancing the accuracy of determination processing (S3).

The plurality of weighting values included in the evaluation table are different from each other (see FIGS. 8A and 8B). In this case, by not including weighting values of the same numerical value in the evaluation table, it is possible to more reliably realize the difference in the sum of the pixel values in the plurality of pixel value sets included in the evaluation table.

The ROM 28b of the multifunction peripheral 20 stores four evaluation tables corresponding to the generation source of the image data. In the determination processing (S3), the CPU 28a of the multifunction peripheral 20 uses the evaluation table corresponding to the generation source of the image data among the four evaluation tables stored in the ROM 28b. For example, between PC print (recording based on data sent from the PC 10) and copy (recording based on data generated by the reading unit 25 of the multifunction peripheral 20), the generation source of image data is different and the method of generating the image data is also different. In the present embodiment, in consideration of such a difference, by using the evaluation table corresponding to the generation source of the image data, it is possible to execute appropriate determination processing (S3) according to the generation source of the image data.

The ROM 28b of the multifunction peripheral 20 stores the FB evaluation table corresponding to the flatbed scanner unit 25x and the ADF evaluation table corresponding to the ADF scanner unit 25y. In this case, by using the evaluation table for FB or ADF while considering that the method of generating image data differs between the flatbed scanner unit 25x and the ADF scanner unit 25y, appropriate determination processing (S3) can be executed depending on the flatbed scanner unit 25x or the ADF scanner unit 25y.

The "FB evaluation table" includes a pixel value set (common pixel value set) that is neither included in the "ADF-first line sensor evaluation table" nor "ADF-second line sensor evaluation table" and a corresponding weighting value. In S13 of the determination processing (S3), in a case where the "ADF-first line sensor evaluation table" or the "ADF-second line sensor evaluation table" is used as the evaluation table corresponding to the generation source of image data, when the pixel value set indicated by the image data is the common pixel value set, the CPU 28a of the multifunction peripheral 20 refers to the "FB evaluation table" including the common pixel value set, and adds up the weighting value corresponding to the common pixel value set. In this case, the amount of data in the entire evaluation table can be suppressed by not storing the data of the common pixel value set in the other evaluation table.

The ADF scanner unit 25y includes the first line sensor 251 and the second line sensor 252. The ADF evaluation table includes the ADF-first line sensor evaluation table corresponding to the first line sensor 251 and the ADF-second line sensor evaluation table corresponding to the second line sensor 252. In this case, considering that the method of generating image data differs depending on the imaging sensor (the line sensors 251, 252), by using the evaluation table corresponding to each imaging sensor, appropriate determination processing (appropriate determination processing according to each imaging sensor) (S3) can be executed.

The ADF-first line sensor evaluation table includes a pixel value set (common pixel value set) not included in the ADF-second line sensor evaluation table and a weighting value corresponding to the common pixel value set. In S13 of the determination processing (S3), in a case where the ADF-second line sensor evaluation table is used as the evaluation table corresponding to the generation source of image data, when the pixel value set indicated by the image data is a common pixel value set, the CPU 28a of the multifunction peripheral 20 refers to the ADF-first line sensor evaluation table including the common pixel value set and adds up the weighting value corresponding to the common pixel value set. In this case, the amount of data in the entire evaluation table can be suppressed by not storing the data of the common pixel value set in the other evaluation table.

In S13 of the determination processing (S3), among the four evaluation tables stored in the ROM 28b, the CPU 28a uses the evaluation table corresponding to the conversion table used in the process (S4) of ejecting ink from the nozzle groups 24C, 24M, 24Y based on the image data. For example, the conversion table used for PC print is different from the conversion table used for copying. In the present embodiment, in consideration of such a difference, by using the evaluation table corresponding to the conversion table, appropriate determination processing (S3) can be executed according to the conversion table.

<Modification>

While the disclosure has been described in detail with reference to the above aspects thereof, it would be apparent to those skilled in the art that various changes and modifications may be made therein without departing from the scope of the claims.

Figure 9:
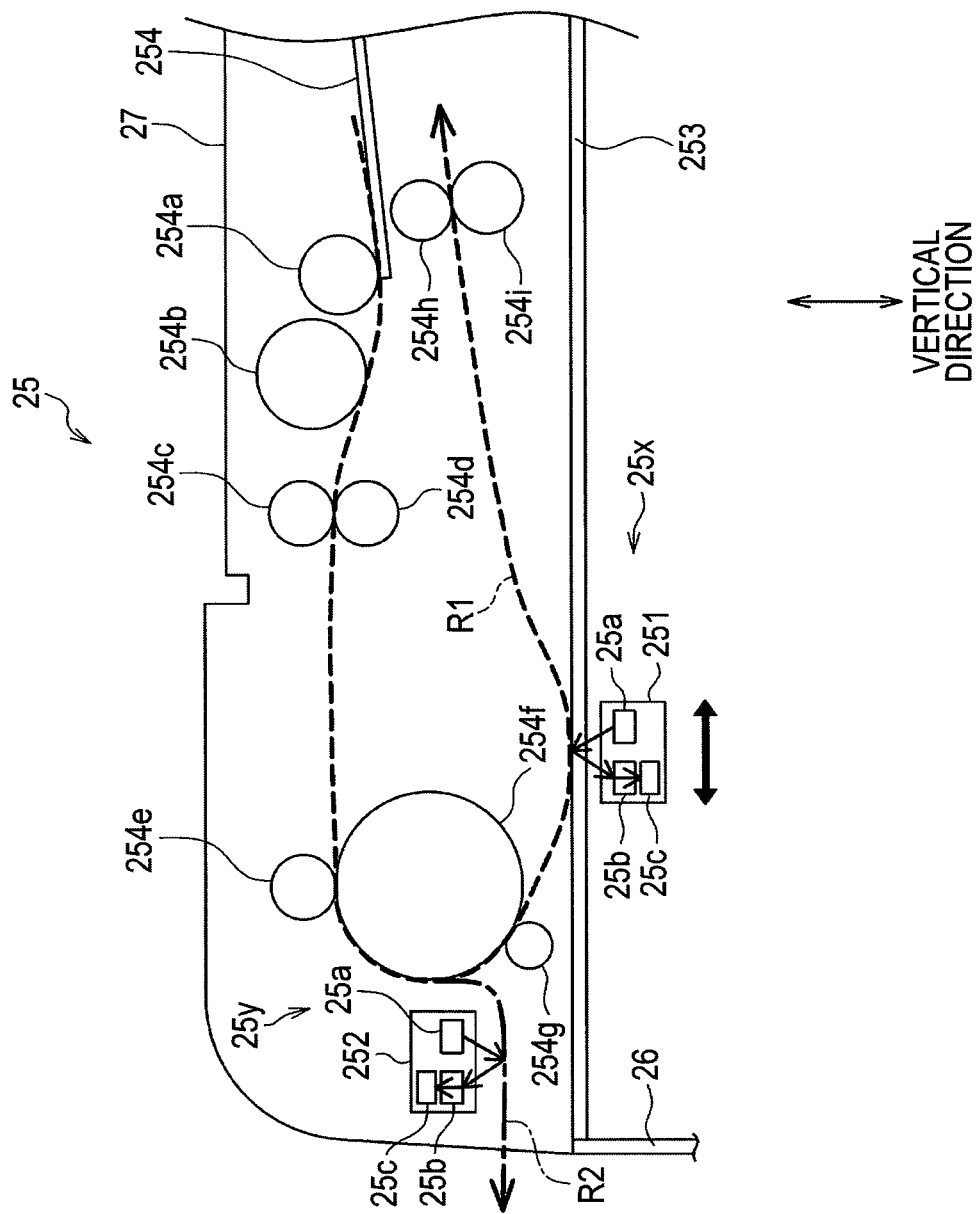
FIG. 9 is a schematic side view showing a reading unit according to a modification.

For example, the reading unit are not limited to the configuration shown in FIG. 5. For example, as shown in FIG. 9, the ADF scanner unit 25y may have a configuration in which a path R1 or a path R2 can be selected. The path R2 branches off from the path R1 on the outer peripheral surface of the ADF roller 254f and heads for a paper discharge portion (not shown) on the outside of the cover 27. The second line sensor 252 is not arranged on the path R1, but is arranged on the path R2. In this configuration, when the path R1 is selected, the first line sensor 251 generates image data of the image recorded on the front surface of the paper P, and when the path R2 is selected, the second line sensor 252 also generates image data of the image recorded on the front surface of the paper P. In the configuration of FIG. 9, the ROM 28b may store four evaluation tables of "the second PC evaluation table", "FB evaluation table", "ADF-first line sensor evaluation table", and "ADF-second line sensor evaluation table", and in S13 the CPU 28a may refer to the evaluation table corresponding to the generation source of the image data among the four evaluation tables as in the above embodiment. For example, in a case where the image data corresponding to the recording instruction is the data generated by the first line sensor 251 of the ADF scanner unit 25y (image data of the paper P passing through the path R1), the CPU 28a may refer to the "ADF-first line sensor evaluation table". In a case where the image data corresponding to the recording instruction is the data generated by the second line sensor 252 of the ADF scanner unit 25y (image data of the paper P passing through the path R2), the CPU 28a may refer to the "ADF-second line sensor evaluation table".

In the above-described embodiment (FIG. 7), the weighting values are added up for each block, and when the addition value (total value) exceeds a threshold value in a certain block, it is determined that one-way recording is to be performed. The present disclosure is not limited to this. For example, it may be determined whether the average value of the total values in a plurality of blocks exceeds a threshold value, and when the average value exceeds the threshold value, it may be determined that one-way recording is to be performed.

In the above-described embodiment (FIG. 7), in S11, the image data of the n-th scan is divided into a plurality of blocks, but the present disclosure is not limited to this. For example, the average value of the pixel values of the entire image data of the n-th scan may be calculated, without dividing the image data of the n-th scan into a plurality of blocks. In this case, the weighting value corresponding to the pixel value set of the average value may be extracted from the evaluation table, and if the extracted weighting value exceeds a threshold value, it may be determined that one-way recording is to be performed.

In the above-described embodiment (FIG. 8), RGB values (tone values from 0 to 255) are exemplified as pixel values, but the pixel values are not limited to these. For example, as the pixel values, Lab values, CMYK values, and so on may be adopted.

In the above embodiment (FIG. 8), the larger the value of the weighting value is, the larger the color difference is. The present disclosure is not limited to this. It may be such that, the smaller the value of weighting value is, the larger the color difference is.

The ROM of the multifunction peripheral may store only one evaluation table.

In the evaluation table, weighting values having the same numerical value may exist.

As the plurality of types of liquids, ink of three colors of CMY has been exemplified in the above-described embodiment, but the present disclosure is not limited to this. For example, as a plurality of types of liquid, ink of CMYK four colors may be adopted, or ink of any color and a treatment liquid that aggregates or precipitates components in the ink may be used.

The recording medium is not limited to paper, but may be cloth, a resin member, and so on.

The image processing apparatus of the present disclosure is not limited to a PC or a multifunction peripheral, and may be a printer (single-function printer), a scanner (single-function scanner), a digital camera, and so on.

The program according to this disclosure may be distributed by being recorded on a removable storage medium such as a flexible disk or a fixed (non-removable) storage medium such as a hard disk, or may be distributed through a network.

What is claimed is:

1. An image processing apparatus comprising:
    a memory configured to store an evaluation table in which a plurality of pixel value sets and weighting values for respective ones of the plurality of pixel value sets are associated with each other, each of the plurality of pixel value sets including pixel values of a plurality of types of liquid; and
    a controller configured to determine whether to perform one-way recording or two-way recording, the one-way recording being recording in which liquid is ejected onto a recording medium from a plurality of nozzle groups of a head in either one of a forward movement and a reverse movement of the head in a scanning direction based on image data and the evaluation table stored in the memory, the plurality of nozzle groups being for ejecting respective ones of the plurality of types of liquid, the plurality of nozzle groups being arranged in the scanning direction, the two-way recording being recording in which liquid is ejected onto a recording medium from the plurality of nozzle groups in both of the forward movement and the reverse movement of the head in the scanning direction,
    each of the weighting values being a value indicative of a difference between an image indicated by the image data and an image recorded on the recording medium, the difference being caused by an overlapping order of the plurality of types of liquid,
    the plurality of pixel value sets in the evaluation table including:
        a first pixel value set;
        a second pixel value set next to the first pixel value set, the second pixel value set having a larger pixel value sum than the first pixel value set, the pixel value sum being a sum of the pixel values of the plurality of types of liquid;
        a third pixel value set having a larger pixel value sum than the second pixel value set;
        a fourth pixel value set next to the third pixel value set, the fourth pixel value set having a larger pixel value sum than the third pixel value set;
        a fifth pixel value set having a larger pixel value sum than the fourth pixel value set; and
        a sixth pixel value set next to the fifth pixel value set, the sixth pixel value set having a larger pixel value sum than the fifth pixel value set,
    a difference between a pixel value sum of the first pixel value set and the pixel value sum of the second pixel value set being larger than a difference between the pixel value sum of the third pixel value set and the pixel value sum of the fourth pixel value set,
    a difference between the pixel value sum of the fifth pixel value set and the pixel value sum of the sixth pixel value set being larger than the difference between the pixel value sum of the third pixel value set and the pixel value sum of the fourth pixel value set.

2. The image processing apparatus according to claim 1, wherein the weighting values included in the evaluation table are different from each other.

3. The image processing apparatus according to claim 1, wherein the memory stores a plurality of evaluation tables used for respective ones of a plurality of generation sources of the image data; and
    wherein the controller is configured to use an evaluation table associated with a generation source of the image data among the plurality of evaluation tables stored in the memory.

4. The image processing apparatus according to claim 3, wherein the plurality of generation sources of the image data includes:
    a flatbed scanner configured to read an image of a recording medium placed on a document table; and
    an ADF scanner configured to read an image of a recording medium while conveying the recording medium; and
    wherein the plurality of evaluation tables stored in the memory include an FB evaluation table for the flatbed scanner and an ADF evaluation table for the ADF scanner.

5. The image processing apparatus according to claim 4, wherein at least one of the FB evaluation table and the ADF evaluation table includes a common pixel value set and a weighting value for the common pixel value set, the common pixel value set being the pixel value set that is not included in an other one of the FB evaluation table and the ADF evaluation table; and
    wherein the controller is configured to refer to the one of the FB evaluation table and the ADF evaluation table in a case where the other one of the FB evaluation table and the ADF evaluation table is used as the evaluation table associated with the generation source of the image data and where the pixel value set indicated by the image data is the common pixel value set.

6. The image processing apparatus according to claim 4, wherein the ADF scanner includes a first imaging sensor and a second imaging sensor; and
    wherein the ADF evaluation table includes a first evaluation table for the first imaging sensor and a second evaluation table for the second imaging sensor.

7. The image processing apparatus according to claim 6, wherein at least one of the first evaluation table and the second evaluation table includes a common pixel value set and a weighting value for the common pixel value set, the common pixel value set being the pixel value set that is not included in an other one of the first evaluation table and the second evaluation table; and
    wherein the controller is configured to refer to the one of the first evaluation table and the second evaluation table in a case where the other one of the first evaluation table and the second evaluation table is used as the evaluation table associated with the generation source of the image data and where the pixel value set indicated by the image data is the common pixel value set.

8. The image processing apparatus according to claim 1, wherein the memory stores a plurality of conversion tables and a plurality of evaluation tables associated with respective ones of the plurality of conversion tables, each of the plurality of conversion tables being for converting the pixel value set into another pixel value set; and wherein the controller is configured to:
in a process of ejecting liquid from the plurality of nozzle groups based on the image data, use one of the plurality of conversion tables stored in the memory; and
among the plurality of evaluation tables stored in the memory, use an evaluation table associated with the one of the plurality of conversion tables used in the process.

9. The image processing apparatus according to claim 1, wherein the controller is configured to determine whether to perform the one-way recording or the two-way recording for each of a plurality of scans.

10. The image processing apparatus according to claim 9, wherein the controller is configured to:
divide image data of n-th scan of the plurality of scans into a plurality of blocks;
refer to the evaluation table and add up weighting values associated with pixel value sets of pixels that form m-th block of the plurality of blocks to obtain a total value;
determine whether the total value exceeds a threshold value for the m-th block;
in response to determining that the total value exceeds the threshold value for one of the plurality of blocks in the n-th scan, determine that the one-way recording is to be performed; and
in response to determining that the total value does not exceed the threshold value for all of the plurality of blocks in the n-th scan, determine that the two-way recording is to be performed.

11. The image processing apparatus according to claim 1, wherein the plurality of types of liquid is a plurality of colors of ink.

12. An image processing system comprising:
a first apparatus including a first memory;
a second apparatus including a second memory, each of the first memory and the second memory being configured to store an evaluation table in which a plurality of pixel value sets and weighting values for respective ones of the plurality of pixel value sets are associated with each other, each of the plurality of pixel value sets including pixel values of a plurality of types of liquid; and
a controller configured to determine whether to perform one-way recording or two-way recording, the one-way recording being recording in which liquid is ejected onto a recording medium from a plurality of nozzle groups of a head in either one of a forward movement and a reverse movement of the head in a scanning direction based on image data and the evaluation table stored in one of the first memory and the second memory, the plurality of nozzle groups being for ejecting respective ones of the plurality of types of liquid, the plurality of nozzle groups being arranged in the scanning direction, the two-way recording being recording in which liquid is ejected onto a recording medium from the plurality of nozzle groups in both of the forward movement and the reverse movement of the head in the scanning direction, each of the weighting values being a value indicative of a difference between an image indicated by the image data and an image recorded on the recording medium, the difference being caused by an overlapping order of the plurality of types of liquid, in each of the first memory and the second memory, the plurality of pixel value sets in the evaluation table including:
a first pixel value set;
a second pixel value set next to the first pixel value set, the second pixel value set having a larger pixel value sum than the first pixel value set, the pixel value sum being a sum of the pixel values of the plurality of types of liquid;
a third pixel value set having a larger pixel value sum than the second pixel value set;
a fourth pixel value set next to the third pixel value set, the fourth pixel value set having a larger pixel value sum than the third pixel value set;
a fifth pixel value set having a larger pixel value sum than the fourth pixel value set; and
a sixth pixel value set next to the fifth pixel value set, the sixth pixel value set having a larger pixel value sum than the fifth pixel value set,
a difference between a pixel value sum of the first pixel value set and the pixel value sum of the second pixel value set being larger than a difference between the pixel value sum of the third pixel value set and the pixel value sum of the fourth pixel value set,
a difference between the pixel value sum of the fifth pixel value set and the pixel value sum of the sixth pixel value set being larger than the difference between the pixel value sum of the third pixel value set and the pixel value sum of the fourth pixel value set,
a capacity of the first memory being larger than a capacity of the second memory,
a number of the pixel value sets included in the evaluation table stored in the first memory being larger than a number of the pixel value sets included in the evaluation table stored in the second memory.

13. A control method of controlling an image processing apparatus including a memory and a controller, the memory storing an evaluation table in which a plurality of pixel value sets and weighting values for respective ones of the plurality of pixel value sets are associated with each other, each of the plurality of pixel value sets including pixel values of a plurality of types of liquid, the control method comprising:
determining whether to perform one-way recording or two-way recording, the one-way recording being recording in which liquid is ejected onto a recording medium from a plurality of nozzle groups of a head in either one of a forward movement and a reverse movement of the head in a scanning direction based on image data and the evaluation table stored in the memory, the plurality of nozzle groups being for ejecting respective ones of the plurality of types of liquid, the plurality of nozzle groups being arranged in the scanning direction, the two-way recording being recording in which liquid is ejected onto a recording medium from the plurality of nozzle groups in both of the forward movement and the reverse movement of the head in the scanning direction, each of the weighting values being a value indicative of a difference between an image indicated by the image data and an image recorded on the recording medium, the difference being caused by an overlapping order of the plurality of types of liquid,
the plurality of pixel value sets in the evaluation table including:
  a first pixel value set;
  a second pixel value set next to the first pixel value set, the second pixel value set having a larger pixel value sum than the first pixel value set, the pixel value sum being a sum of the pixel values of the plurality of types of liquid;
  a third pixel value set having a larger pixel value sum than the second pixel value set;
  a fourth pixel value set next to the third pixel value set, the fourth pixel value set having a larger pixel value sum than the third pixel value set;
  a fifth pixel value set having a larger pixel value sum than the fourth pixel value set; and
  a sixth pixel value set next to the fifth pixel value set, the sixth pixel value set having a larger pixel value sum than the fifth pixel value set,
a difference between a pixel value sum of the first pixel value set and the pixel value sum of the second pixel value set being larger than a difference between the pixel value sum of the third pixel value set and the pixel value sum of the fourth pixel value set,
a difference between the pixel value sum of the fifth pixel value set and the pixel value sum of the sixth pixel value set being larger than the difference between the pixel value sum of the third pixel value set and the pixel value sum of the fourth pixel value set.

* * * * *